United States Patent [19]

Diepers et al.

[11] Patent Number: 4,924,334
[45] Date of Patent: May 8, 1990

[54] MAGNETIC STORAGE DEVICE WITH TRACK GUIDANCE SYSTEM

[75] Inventors: Heinrich Diepers, Hoechstadt; Dietrich Stephani, Bubenreuth, both of Fed. Rep. of Germany

[73] Assignee: Siemens Aktiengesellschaft, Berlin & Munich, Fed. Rep. of Germany

[21] Appl. No.: 233,235

[22] Filed: Aug. 17, 1988

[30] Foreign Application Priority Data

Aug. 17, 1987 [DE] Fed. Rep. of Germany ....... 3727432

[51] Int. Cl.$^5$ .......................... G11B 5/39; G11B 5/596
[52] U.S. Cl. .............................. 360/77.07; 360/77.11; 360/103
[58] Field of Search .................. 360/77.07, 77.11, 103, 360/113, 126

[56] References Cited

U.S. PATENT DOCUMENTS 4,317,149  2/1982  Elser et al. ........................... 360/126
4,648,087  3/1987  Scranton et al. ..................... 360/103
4,729,048  3/1988  Imakoshi et al. ................. 360/77.11
4,800,454  1/1989  Schwarz et al. ..................... 360/103
4,823,205  4/1989  Hannon et al. ...................... 360/103

OTHER PUBLICATIONS

D. R. McEfee, Read/Write Servo Magnetic Head, IBM Technical Disclosure Bulletin, vol. 20, No. 19, Feb. 1978, pp. 3673-3674.

Primary Examiner—Aristotelis M. Psitos
Assistant Examiner—David L. Robertson
Attorney, Agent, or Firm—Kenyon & Kenyon

[57] ABSTRACT

A magnetic storage device which includes a magnetizable storage disk, a read/write magnetic head arranged on a flying body and a track guidance system has a servo head formed on a long side face of the flying body in the form of a magneto restrictive sensor. Subsequent electronics keep the head on at least one separate guidance track.

18 Claims, 5 Drawing Sheets

MAGNETIC STORAGE DEVICE WITH TRACK GUIDANCE SYSTEM

BACKGROUND OF THE INVENTION

The present invention relates to a magnetic storage device having a magnetizable storage disk, at least one read/write magnetic head and a track guidance system that contains a servo head rigidly connected with the magnetic head for guidance. The magnetic head is arranged on a flying body that aerodynamically glides over the moving storage disk. Electronics coupled to the servo head output keep it on the guidance track.

High density storage of information (data) on disk-shaped recording media is known according to the principle of longitudinal (horizontal) magnetization as well as the principle of perpendicular (vertical) magnetization (cf. for example "IEEE Transactions on Magnetics", Vol. MAG-16, No. 1, January 1980, pages 71 to 76 or Vol. MAG-20, No. 5, September 1984, pages 657 to 662 and 675 to 680). The read/write magnetic heads used for these kinds of magnetizations are best implemented in thin film technology on non-magnetic substrates. The distance between a magnetic head and the surface of the storage disk should be kept exceedingly small and should be below 1 μm for vertical magnetization. Such small distances, however, can be practically ensured only by developing the substrate carrying the magnetic head as a flying body (a slider) which flies aerodynamically over the storage disk rotating underneath it.

To this end, the substrate on its underside facing the recording medium is best equipped with appropriate landing or flying skids (cf. for example EP-A-O 137 051). Guiding such a flying read/write magnetic head of a corresponding magnetic storage device requires a so-called track positioner and, in general, also a track holding system. Linear or angular positioners are employed for track positioning in connection with a specific servo disk. This servo disk carries a fixedly inscribed raster of guidance tracks. These tracks are read with the aid of a suitable servo head which, in rigid mechanical connection with the read/write magnetic head, ensures that the track pattern is transferred to the data surface of the actual data storage disk and can, correspondingly, be found again during the read process.

The mechanical tolerance of the drive system for the storage, servo disk and the head positioner determine the limits of this guidance technology. Any further increase of track density therefore requires, for example, further development of the drive mechanics. The expenditures required in production are, however, very high and, hence, cost-intensive. Known alternatives are additional servo measures in which the storage disk itself is drawn on for track guidance. A corresponding arrangement, referred to as an "embedded servo", reads previously fixedly written servo data before each storage block to follow up the track positioning. A variant of this technique is described, for example in "Electronics", Nov. 13, 1986, pages 81 to 83. This servo principle, however, presupposes that the cooperation of drive mechanic and head positioner is reproducable within limits of, for example, ±2 μm. However, current development tendencies that use the principle of vertical magnetization aim for track widths in the range of 10 μm or less. The servo systems must continuously track the read/write magnetic head using so-called "track locking".

SUMMARY OF THE INVENTION

The present invention implements a magnetic storage device of the kind mentioned in the beginning to ensure continuous tracking. This task is solved according to the invention by writing the storage disk with at least one separate guidance track and disposing the servo head along a long side of the flying body in the form of a magneto-resistive sensor.

This design of the magnetic storage device requires no additional servo disk for continuous guidance of the magnetic head. The drive system of the storage device and particularly the guidance of the magnetic head is correspondingly simple. The separate guiding track required for guiding the head can be kept very small. Since it lies within the region midway between adjacent data tracks, storage area is not only not lost but actually is gained since the entire midway region can be built correspondingly small. The arrangement of the magneto-resistive sensor on a side face of the flying body ensures that no part of the very narrow rearward area of the flying body that is available for the magnetic head is used.

The principle of construction according to the present invention obtains several additional advantages. The permanently acting track guidance system can adapt its implementation, such as its "feedback frequency", to a particular storage device. The magnetic head is positioned to a specific track simply by counting the guidance tracks. Track deviation is clearly recognized since a linear characteristic can be obtained. Track holding in the submicrometer range which is essentially dependent only on the position accuracy of the guidance tracks, can be realized. The precise track holding permits track guidance along non-circular tracks such as are developed, for example, on plastic substrates. High radial tolerance of drive and positioning mechanics or with respect to temperature constancy are not necessary so that shorter positioning times can be achieved and the positioning mechanics can be developed with less weight. "Soft-sectoring", i.e., the elimination of sector division (formatting), is possible which permits free selection of sector length. Finally track guidance and data track information are detected and processed by separate read heads without requiring special filter technology so that a correspondingly high degree of freedom exists in the lay-out of the magnetic head for reading and writing data as well as for the servo heads.

DETAILED DESCRIPTION

Figure 1:
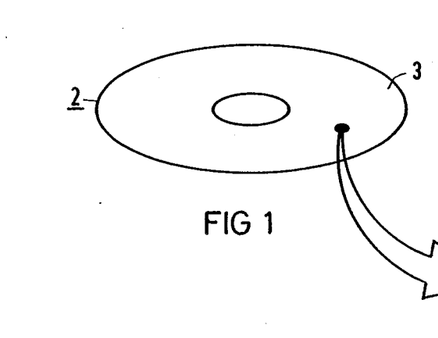
FIG. 1 shows a storage disk.
Figure 2:
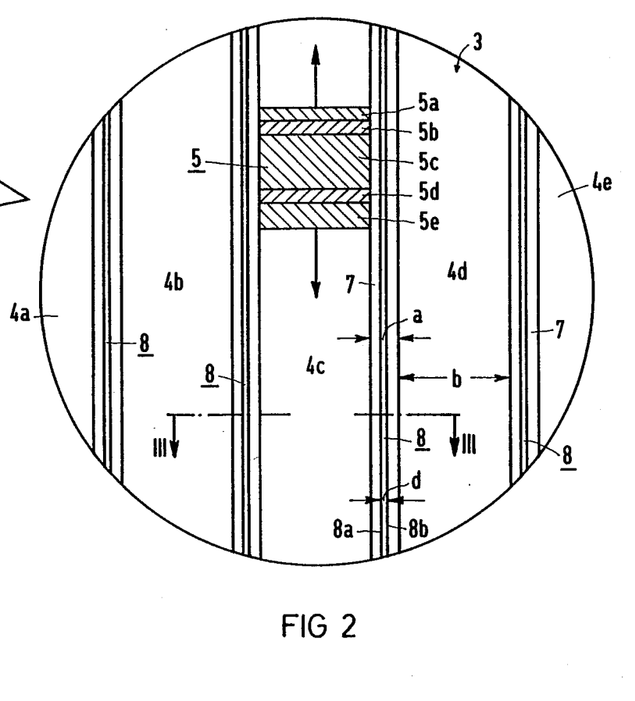
FIG. 2 shows a segment reproduced on an enlarged scale.

FIG. 1 shows an oblique view of a storage disk 2 of a magnetic storage device according to the invention. In FIG. 2 a segment from the data carrier surface 3 of this disk 2 is reproduced.

FIG. 2 shows a top view of a segment of the data carrier surface. Five data tracks 4a to 4e can be seen which consist of a material suitable to the selected magnetization principle of the present invention. In accordance with one embodiment, it may be assumed that CoCr is to be magnetized vertically. In FIG. 2, data track section 5 of data track 4c is shown with corresponding magnetized data blocks 5a to 5e. Each data track has a width b perpendicular to the relative direction of motion of each corresponding magnetic head with respect to the longitudinal direction of the track on the order of magnitude of approximately 10 μm. Between each adjacent data tracks is a narrow midway region 7 which has a transverse extent of approximately 2 to 3 μm. The midway regions 7, also referred to as "grass", include double tracks 8 written in the longitudinal direction. Tracks 8 have two parallel continuous guidance tracks 8a and 8b that are also referred to as servo tracks. The servo tracks are closely adjacent to each other and are vertically magnetized in the opposite direction. The corresponding write process for magnetization of these tracks can be carried out, for example, in a single run with a known read/write magnetic head arranged to rotate by 90'. It is best if both magnetic poles of the head have a magnetic field of equal strength and opposite polarity. The gap width between the two magnetic poles of such head essentially determines the mutual distance of the two generated servo tracks 8a and 8b. Distance d is generally below 1 μm.

Figure 3:
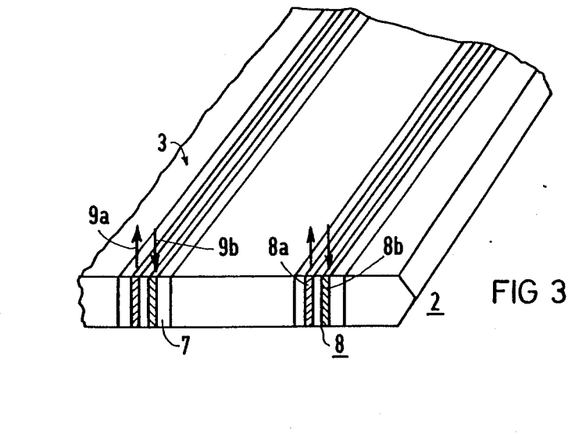
FIGS. 3 and 4 each show servo tracks of the storage disk.
Figures 4, 5:
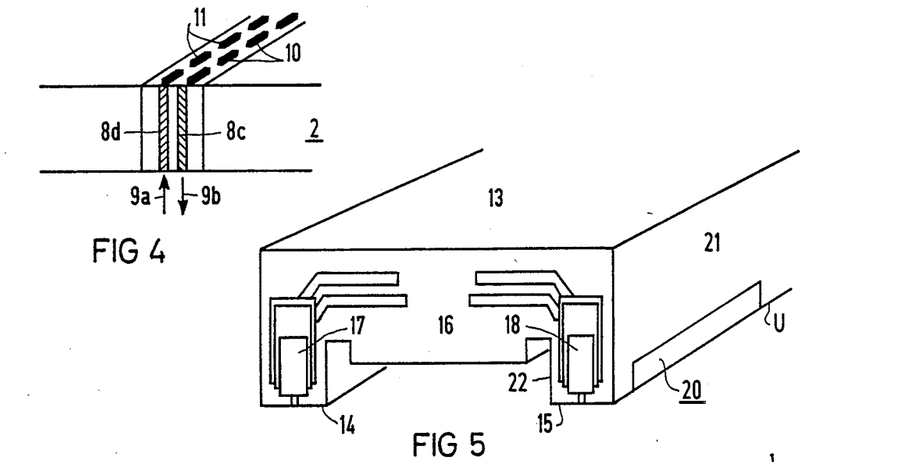
FIG. 5 shows a flying body of a storage device.

FIG. 3 shows s section across two midway regions 7 along a line marked III—III in FIG. 2. FIG. 3 illustrates the opposite magnetization directions of the pairwise parallel servo tracks 8a and 8b with arrow lines 9a and 9b respectively. FIG. 4 shows a corresponding representation of an alternative embodiment of the servo double tracks shown in FIG. 3. The two servo tracks of these double tracks extend parallel in the guidance direction and do not necessarily need to be implemented as continuous tracks. As is shown in FIG. 4, each of the two parallel servo tracks 8c and 8d can be sequentially subdivided into individual signal sections 10, 11 in the direction of guidance, the sections located at a slight distance from each other. If such interrupted servo tracks are written at constant speed and constant frequency, then advantageously an "on track" trigger signal for stabilization of the speed can be used during later use to, for example, reduce bit shift errors.

FIG. 5 shows an oblique view onto a substrate fashioned as flying body 13 made of, for example, a non-magnetic material. On the underside of this flying body are formed two flying skids 14 and 15 which permit the flying body to aerodynamically glide over a storage disk. On the rearward flat face 16, seen in the relative direction of motion of the flying body with respect to the storage disk, read/write magnetic head 17 and 18 are arranged in the region of each of the flying skids 14 and 15. One of these magnetic heads, such as head 17, might be a functionless "blind" head. This head, hence, could be omitted. At least one magnetic head, such as head 18, reads and writes to and from the storage disk guided underneath it depending on the magnetization principle selected, such as, for example, vertical magnetization. A known servo head 20 in the form of a magneto-resistive sensor precisely guides flying body 13 and magnetic head 18 along a corresponding data track, according to the invention. This servo head is arranged, according to the invention, on one of the long side faces 21 of the flying body 13 opposite to the storage disk and borders on the lower edge U of the flying body. The servo head lies on the outside of flying skid 15 according to the embodiment shown in FIG. 5. It is, however, equally possible to arrange a corresponding servo head on the inside 22 of this skid.

Figure 6:
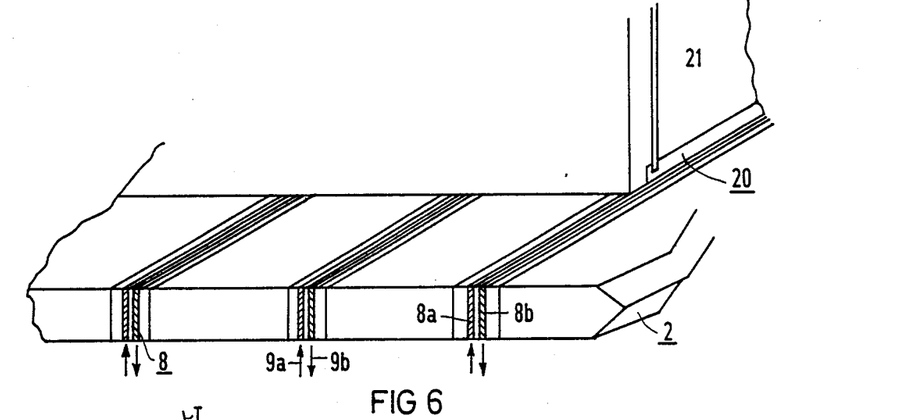
FIG. 6 shows the arrangement of this flying body above a storage disk.

FIG. 6 shows, in an oblique view, the positioning of the servo head 20 shown in FIG. 5 above a storage disk 2 as shown in FIG. 3. The ideal position of this servo head 20 and, consequently, of the at least one assigned read/write magnetic head is given when the servo head is exactly between servo tracks 8a and 8b. Deviations toward the right or left then lead to positive or negative signals at the servo head or its subsequent electronics respectively. The magnitude and direction of deviation from the ideal position can be recognized and corrected if necessary (cf. also FIG. 9).

Figure 7:
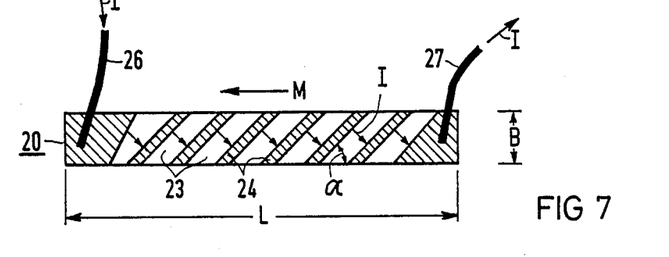
FIGS. 7 and 8 each show a model of a servo head in greater detail.

A model of the servo head 20 according to FIGS. 5 and 6 developed as magneto-resistive sensor is shown in greater detail in top view in FIG. 7. This sensor can be implemented advantageously in a structure known as a "barber pole" (cf. for example "IEEE Transactions on Magnetics". Vol. MAG-11, No. 5, September 1975, pages 1215 to 1217 or Vol. MAG-17, No. 6, November 1981, pages 2884 to 2889). A corresponding element is distinguished by a layer or surface 23 of a magneto-resistive material such as, for example, a NiFe alloy. In general, layer 23 is a sandwich of several thin items of the magneto-resistive material separated by thin insulating films such as $SiO_2$. Narrow strips 24 of a good electrical conductor such as Au are applied on the surface. These conductor strips 24 are arranged at a distance from each other and at an angle alpha of, in particular, 45' with respect to the easy axis of magnetization M of the magneto-resistive material of layer 23. Current I flows vertically between the conductor strips 24. The current is forced to assume this angle alpha with respect to the magnetization direction M. Additional laterally connecting conductors 26 and 27 of magneto-resistive sensor are indicated in the figure.

Typical dimensions of a sensor that functions as a servo head 20 has a thickness of approximately 25 to 50 nm. If the head is to be used with a linear positioner it can have a longitudinal length L of approximately 10 to 100 μm and a vertical width B of approximately 10 to 50 μm. When a rotary positioner is used, shorter lengths of less than 10 μm are preferred in order to minimize signal attenuations caused by varying skew angles encountered when changing from track to track.

Figure 8:
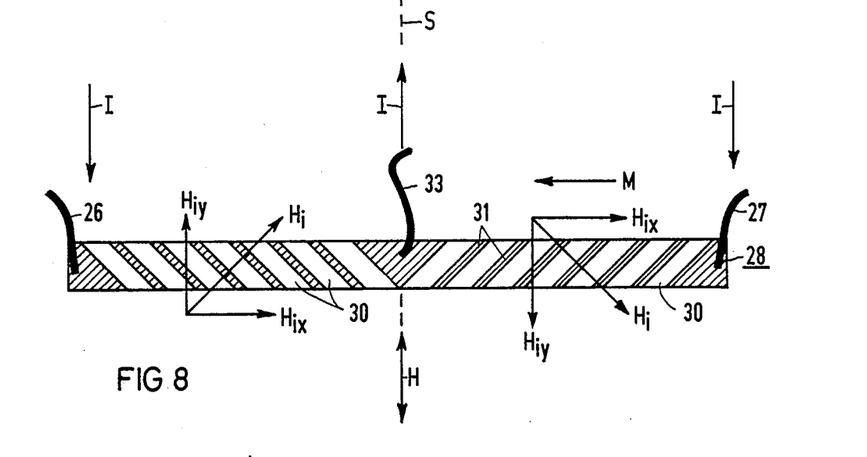

A further model of a magneto-resistive a sensor that functions as servo head is shown in the top view in FIG. 8. This servo head 28 is formed by an element which is constructed as mirror image with respect to a plane of symmetry S (cf. for example "IEEE Transactions on Magnetics", Vol. MAG-18, No. 2, March 1982, pages 763 to 768). The servo head 28 likewise contains a magneto-resistive layer or surface 30 on which parallel conductor strips 31 are obliquely arranged with respect to the axis of magnetization M. In a perpendicular field H, such as is brought about by a servo double track, the field components shown in the figure are induced in this sensor. $H_{iy}$ is induced in the direction of field H, $H_{ix}$ in the direction transversely to it, and $H_i$ in the current direction. In the figure the direction of flow of current I on lateral connecting conductors 26 and 27 and a central connecting conductor 33 are also indicated with arrows.

Figure 9:
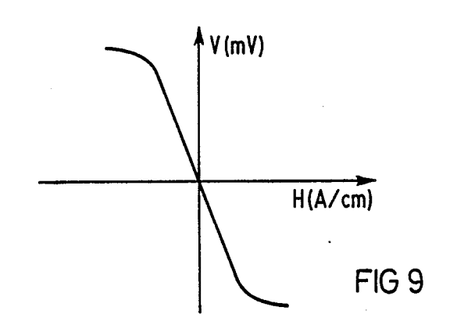
FIG. 9 shows the characteristic of a servo head.

If such servo head 28 is guided over a servo double track 8 according to FIGS. 3 or 4, then voltages occur at its connecting conductors 26, 27, 33 which can be read from the characteristic of its sensor which is reproduced in FIG. 9 (cf. also "NTG-Fachberichte", Vol. 76, pages 69–75). The magnetic field H of the servo double track is plotted on the x-axis and the signal or connecting voltage V occurring between the connecting conductors is on the y-axis. If the servo head is exactly in its ideal position, where the fields of the two parallel servo tracks exactly cancel each other, no signal occurs at the connecting conductors. As shown in FIG. 9, the connecting voltage V is at least largely linear over a relatively large area of the H field. Such a characteristic can be advantageously utilized for precise track guidance using electronics coupled to the sensor of the servo head.

Figure 10:
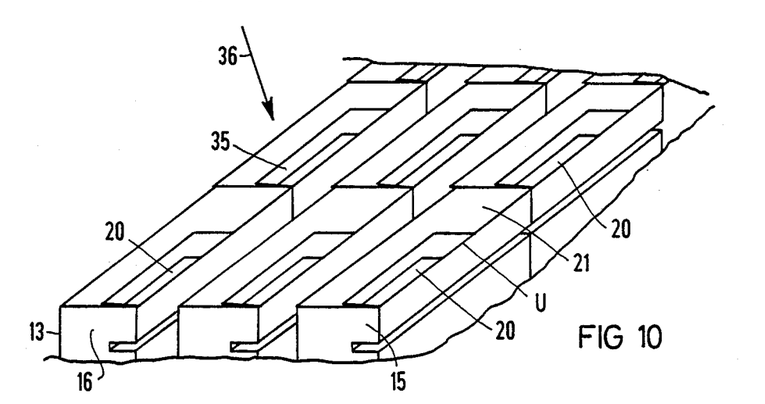
FIG. 10 indicates a step in the production method of servo heads.

FIG. 10 shows in an oblique view a possibility for large-scale (commercial) manufacture of flying skids 15 carrying magneto-resistive sensors 20 or 28 on the outer edges of read/write heads. The sensor material, for example NiFe in a ratio of 81/19, is vapor deposited obliquely through apertures 35 of masks. The vapor beam 36 is inclined upward as well as to the left side so that the front edges and the skid edges of the flying bodies 13 represent shadow-casting edges. The flying bodies are therefore preferentially spaced from each other. A further possible production method is sputtering with HF plasma. Here, the flying bodies 13 are preferentially densely packed to avoid covering the lower flying edges and the rearward front faces with the read/write magnetic heads. The magnetic head areas are not shown in FIG. 10.

The actual magneto-resistive sensor elements functioning as servo heads are, in any case, cut precisely from the deposition spot by laser beam separation and reproducible from flying body to flying body. The strip metallization, for example of Au or other suitable conductor materials, for forming the conductor strips 24 or 31 of the sensors formed as barber poles likewise is carried out by vapor deposition or sputtering and subsequent structuring with known thin-film lithography or thin-film lift-off technology. Other methods can also be used such as, for example, laser enhanced plasma deposition or chemical vapor deposition with laser-enhanced plasma ("laser enhanced plasma CVD"). Herein, the individual conductor tracks of the sensors can advantageously be written directly.

The magneto-resistive layers 23 or 30 of, for example NiFe, are preferentially applied as double layers with an insulating intermediary layer, for example of $SiO_2$ having a thickness of 0.01 to 0.05 $\mu$m. Closing domains are thus advantageously avoided. Domain movement or blocking generates hysteresis and non-linearity in the characteristic. The sputtering conditions used in the manufacture of the read/write magnetic heads determines how to minimize the magnetostriction of the NiFe layers. This leads advantageously to a one domain-layer or at least reduces the domain split during magnetization and demagnetization.

The embodiments shown in FIGS. 2 to 6 assume that the servo double tracks 8 are written on the storage disk by a separate write head independently of the flying body represented. It is, however, also possible to position the required write directly on the flying body which carries the servo head and at least one read/write magnetic head. A corresponding system of heads on a flying body is the basis of the embodiments shown in FIGS. 11 to 16.

Figure 11:
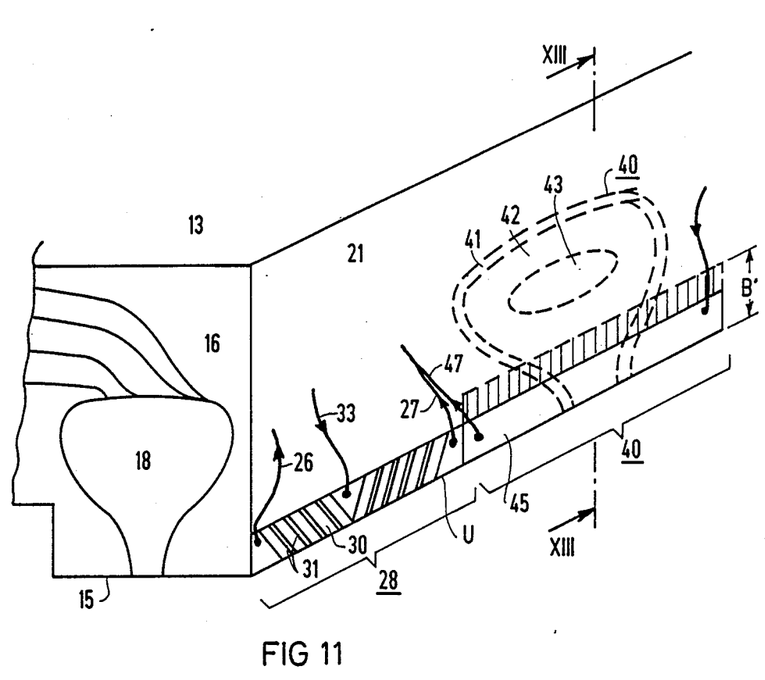
FIGS. 11–16 show alternate embodiments of heads for writing servo tracks.

FIG. 11 shows an oblique view of a segment of a flying body 13. The rearward flat face 16 in the region of its flying skid 15 has a read/write magnetic head 18 that is indicated only in general outline. The long face 21 of the flying body 13 also carries a servo head 28 with connecting conductors 26, 27, and 33 as shown, for example, in FIG. 8. Further, the long face 21 of the flying body has, in addition, a write head 40 that functions as a purely inductive sensor. This head is intended to function exclusively for writing a servo double track such as is illustrated, for example, in FIGS. 2 to 4 and 6. The track write head 40 contains a lower and an upper pole pieces 41, 42 of ferromagnetic material such as NiFe. These pieces form, on the side facing away from a recording medium, a common pole return in a connection region 43. The two pole pieces 41 and 42 are at a distance from each other outside of this region and have a conductor loop 45 extending through a gap region facing the recording medium and functioning as write or excitation winding. This conductor loop is formed by a thin conductor band of vertical width B′ extending parallel to the lower edge U of the long face 21. The conductor band is connected outside of the head region to two connecting conductors 46 and 47. An excitation current I′ flowing along the lower edge U can then be guided through the conductor loop 45. As further indicated in the figure, the connecting conductor 47 of the conductor loop 45 extends adjacent to the servo head 28 and, hence, to its connecting conductor 27, and could be combined with this connecting conductor 27 to form a common connecting conductor.

Figure 12:
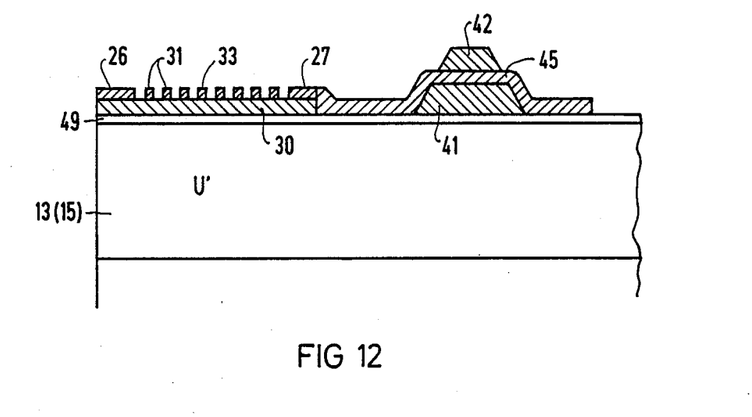

The arrangement of the write head 40 and the servo head 28 in FIG. 11 are shown in FIG. 12 in a top view of the lower face U′ of flying skid 15. As shown, a further insulating layer 49 separates the material of the flying body and its flying skid 15 from the material of the servo head 28 and the track write head 40. The conductor loop 45 of the track write head is further shown as located at least approximately in the same plane parallel to the long face 21 as the conductor strips 31 of the servo head. This ensures that track guidance remains unchanged relative to a data track.

Figure 13:
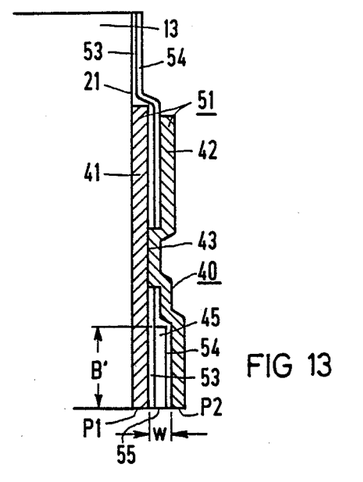

FIG. 13 shows a cross-section through the track write head 40 shown in FIG. 11. The section is along the line identified in FIG. 10 by XIII—XIII. The extremely simple structure of the write head 40 is apparent in FIG. 13. This head contains essentially only a yoke-like magnetic guide body 51 formed by the two pole pieces 41 and 42. These pole pieces are best constructed of sandwich-like thin films of ferromagnetic material such as, for example NiFe. The thin films are each separated by an insulating film such as $SiO_2$. The conductor loop 45 represents a single excitation winding of suitable size. This winding, for example Cu, is bilaterally insulated from the magnetic material of the pole pieces 41 and 42 through insulating layers 53, 54, using, for example, $SiO_2$. The excitation winding in this model is brought forward up to the pole tips P1 and P2 of pole pieces 41 and 42 facing a recording medium. Consequently, the thickness of this conductor loop determines essentially width w of the gap 55 formed between pole tips P1 and P2. As can be further seen in the Figure, the two insulating layers 53 and 54 are arranged in an intermediary space which is developed on the side of the two pole pieces 41 and 42 facing away from the recording medium and lying outside the connecting region 43.

Figure 14:
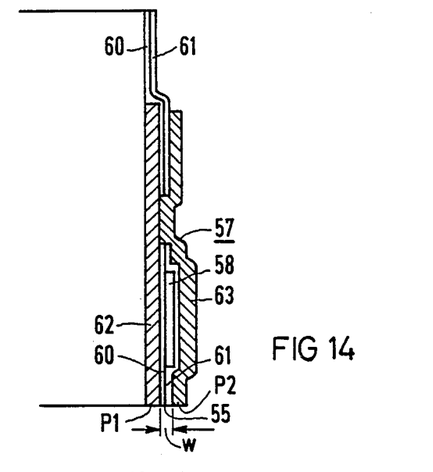

A further model of a track write head 57 is shown in FIG. 14. This write head 57 differs from write head 40 in that a conductor loop 58 functions as an excitation winding while not extending into the region of the two pole tips P1 and P2. The gap width w' of gap 55 between these two pole tips is accordingly determined only by the thickness of the insulating layers 60 and 61 with which the conductor loop 58 is insulated from the ferromagnetic material of the two pole pieces 62 and 63. This model has particular advantage for a precise, rapid, and narrow tolerance track following. The two servo tracks of a double track have different directions of magnetization that lie correspondingly close to each other.

Different embodiments of essential steps for the common production of servo heads and track write heads are outlined below.

A first design for FIGS. 11–13 uses the following steps. The first step involves sputtering an insulating layer 49 of $Al_2O_3$, if the flying body 13 consists of an electrically conducting material. The next step involves forming the magneto-resistive sensor surface by lithography and microstructuring. Next, the lower pole piece 41 of the track write head 40 is produced with known "lift-off" technology, for example, applying a NiFe layer having a thickness of 0.5 to 1 $\mu$m by sputtering. An $SiO_2$ insulating layer 53 having a thickness of, for example, 0.1 $\mu$m is sputtered on and microstructured so that the lower pole piece 41 is initially fully covered. The opening of the connection region 43 for the pole return is subsequently laid free. The next step involves sputtering or vapor depositing a layer over the entire surface, for example of Cu, and subsequently microstructuring the barber pole geometry of the servo head 28 as well as the conductor loop 45 of the track write head 40 functioning as excitation winding. The vertical width B' of the conductor loop 45 can be adapted in accordance with the required excitation current and the occurring power dissipation. Next the second insulating layer 54 is applied and microstructured to insulate the conductor loop 45 in the pole region from the upper pole piece 42. This insulating layer, too, can be removed in the connection region 43. The next step involves applying by sputtering or vapor deposition a second NiFe layer of approximately identical thickness as the first NiFe layer of the lower pole piece 41 and subsequently microstructuring the upper pole piece 42 according to known technologies. An $Al_2O_3$ layer is then sputtered on as protective layer. Finally the lower edge U or lower face U' of the flying skids are reworked by mechanically reworking flying skid 15.

Particularly the embodiment shown in FIG. 13 can be applied using a servo positioner or other control arrangement if a track raster is set during writing of the servo tracks.

A second design shown in FIGS. 11, 12, and 14. The embodiment shown particularly in FIG. 13 permits writing a first track "0", for example, as innermost track, and subsequently reading the previously written track with the servo head and simultaneously writing a new track with the write head. This is carried out to manufacture this with each additional track model the following changes in the sequence of the foregoing production steps are required. First, the servo head must be manufactured as stated in the description of FIG. 10. Next, an $Al_2O_3$ insulating layer of a thickness corresponding to the desired track raster is sputtered. The track write head is then manufactured as described for the first design.

Figure 15:
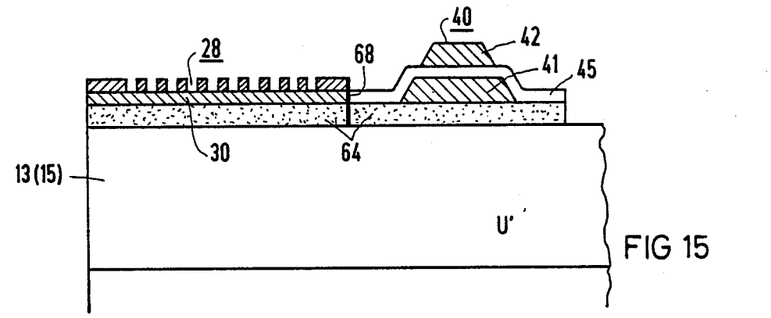

A third design is shown in FIG. 15. FIG. 15 shows a top view of a servo head 28 and an associated track write head 40 in a representation corresponding to FIG. 12. The alternate embodiment shown in FIG. 12 has two heads bordering each other at junction 68 and can be produced on at least one thin glass substrate 64 in multiple arrangement. To this end, the production steps described for the first or second designs should be chosen. Further steps include separating the servo head and track write head through micromechanical sawing into discrete elements. The glass substrate 64 is also brought into contact with the side face 21 of the flying body 13. Mere adhesion may supply sufficient frictional connection depending on the flying body material used, and the planarity of the face of flying body and glass substrate 64. However, precise positioning on the lower edge of the flying skid is required.

Figure 16:
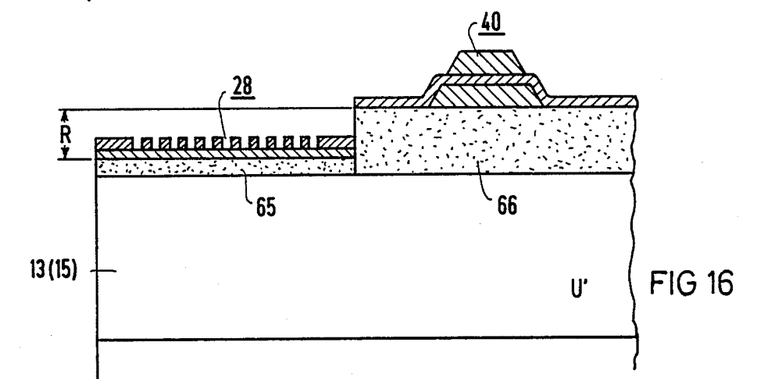

A fourth design is shown in FIG. 16. FIG. 16 is a top view of the lower face U' of the flying skids of a flying body 13. A servo head 28 and a track write head 40 are shown. In contrast to the embodiment shown in FIG. 14, however, the servo head 28 and the write head 40 are manufactured on glass substrates 65, 66 of different thicknesses. The thickness difference R of the glass substrates 65 and 66 is selected in accordance with the required track pattern.

Rather than form substrates 65 and 66 from different thicknesses of glass, these substrates might be formed from 2 to 7 $\mu$m thick plastic films such as, for example, of kaptone or polyethylene.

The embodiments shown in FIGS. 1 to 16 assume that the invention uses a storage system operated according to the principle of vertical magnetization. The measures according to the invention can, however, also use the principle of longitudinal magnetization. Here, advantageously three servo tracks are written in each instance to obtain two magnetization transitions. A servo head in the form of a magneto-resistive sensor could then be placed at the center of the three servo tracks.

What is claimed is:

1. A magnetic storage device, comprising:
    a magnetizable storage disk;
    a flying body adapted to glide aerodynamically over said storage disk, said flying body having a long side face;
    at least one read/write magnetic head arranged on said flying body to write data on and read data from such disk; and
    a track guidance system for guiding the magnetic head including:
    at least one separate guidance track on said disk; and
    a servo head in the form of a magneto-resistive sensor disposed on a long side face of said flying body whereby subsequent electronics coupled to said servo head can be used to keep said servo head positioned on said guidance track.

2. A storage device as claimed in claim 1, wherein the storage disk is perpendicularly (vertically) magnetized, and
    the guidance track is formed as a servo double guidance track having two parallel servo tracks that have antiparallel directions of magnetization.

3. A storage device as claimed in claim 1, wherein the storage disk is longitudinally (horizontally) magnetized and the guidance track is formed by three parallel servo tracks with adjacent servo tracks having antiparallel magnetization directions.

4. A storage device as claimed in claim 2 wherein said disk contains a plurality of parallel data tracks and the guidance track is in a region midway between parallel data tracks.

5. A storage device as claimed in claim 4 wherein the servo head is a magneto-resistive sensor of the barber pole type.

6. A storage device as claimed in claim 5, wherein the servo head forms a mirror image with respect to a plane of symmetry.

7. A storage device as claimed in claim 5, wherein the servo head is formed as a thin-film structure.

8. A storage device as claimed in claim 7, and further including a separate track write head disposed on said flying body in addition to the servo head for writing the guidance track.

9. A storage device as claimed in claim 8, wherein the track write head is formed as an inductive sensor having a number of pole pieces corresponding to the number of servo tracks of the guidance track.

10. A storage device as claimed in claim 9, wherein the pole pieces adjoin each other only in a connection region that faces away from the storage disk, the pole pieces being at a distance from each other outside the connection region, and including at least one conductor loop extends to form an excitation winding between distanced parts of the pole pieces facing the storage disk.

11. A storage device as claimed in claim 10, wherein the conductor loop provides a single conductor path.

12. A storage device as claimed in claim 11, wherein the conductor loop extends up to a region of the poles formed by the pole pieces facing the storage disk.

13. A storage device as claimed in claim 12, wherein the conductor loop extends through an intermediary space between the pole pieces that lies outside of the region occupied by the poles of the pole pieces facing the storage disk.

14. A storage device as claimed in claim 13, wherein the track write head is a thin-film structure.

15. A storage device as claimed in claim 14, wherein the magneto-resistive parts of the servo head lie in the same planar region extending parallel to the long face of the flying body as the gap that is formed between the poles of the pole pieces facing the storage disk.

16. A storage device as claimed in claim 14, wherein the magneto-resistive parts of the servo head are arranged in a first plane extending parallel to the long face of the flying body and a gap in a further plane parallel thereto is formed between the poles of the pole pieces facing the storage disk.

17. A storage device as claimed in claim 16, wherein the servo head and the track write head are arranged on a common substrate plane.

18. A storage device as claimed in claim 16, wherein the servo head and the track write head are arranged on different substrate planes.

* * * * *